US009781352B2

(12) United States Patent
Nagashima (10) Patent No.: US 9,781,352 B2
(45) Date of Patent: Oct. 3, 2017

(54) IMAGING APPARATUS, IMAGING METHOD, AND IMAGING OPERATION CONTROL PROGRAM

(71) Applicant: Kenji Nagashima, Kanagawa (JP)

(72) Inventor: Kenji Nagashima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 110 days.

(21) Appl. No.: 14/991,488

(22) Filed: Jan. 8, 2016

(65) Prior Publication Data

US 2016/0212316 A1 Jul. 21, 2016

(30) Foreign Application Priority Data

Jan. 19, 2015 (JP) ................. 2015-007721

(51) Int. Cl.
*H04N 5/235* (2006.01)
*H04N 13/02* (2006.01)
(Continued)

(52) U.S. Cl.
CPC ......... *H04N 5/2353* (2013.01); *H04N 5/2258* (2013.01); *H04N 5/2351* (2013.01); *H04N 5/247* (2013.01); *H04N 13/0296* (2013.01)

(58) Field of Classification Search
CPC ..................................................... H04N 5/235
(Continued)

(56) References Cited

U.S. PATENT DOCUMENTS

2001/0013903 A1* 8/2001 Suzuki ................. H04N 5/2353
348/362

2006/0140510 A1 6/2006 Wallace et al.
(Continued)

FOREIGN PATENT DOCUMENTS

JP 06-064751 A 3/1994
JP WO 2013038950 A1 * 3/2013 ......... H04N 13/0018
(Continued)

OTHER PUBLICATIONS

Extended European Search Report dated Mar. 30, 2016 in Patent Application No. 16151121.7.
(Continued)

*Primary Examiner* — Anthony J Daniels
(74) *Attorney, Agent, or Firm* — Oblon, McClelland, Maier & Neustadt, L.L.P.

(57) ABSTRACT

An imaging apparatus includes a plurality of imaging sections that images an imaging region, a parallax information generator that generates parallax information based on images by the imaging sections, and an exposure amount controller that determines an exposure amount for use in the imaging sections in a subsequent imaging operation to increase a number of parallax values contained in a parallax value group of an image portion showing a target in the imaging region, wherein the exposure amount controller executes parallax information obtaining control that obtains the parallax information corresponding to a plurality of exposure amounts generated based on the images with the exposure amounts, and executes exposure amount identifying control that identifies the exposure amount corresponding to the parallax information having a maximum number of parallax values in the obtained parallax information to determine the exposure amount for use in the imaging sections based on the identified exposure amount.

18 Claims, 5 Drawing Sheets

(51) Int. Cl.
*H04N 5/247* (2006.01)
*H04N 5/225* (2006.01)

(58) Field of Classification Search
USPC .................................................. 348/42, 47
See application file for complete search history.

(56) References Cited

U.S. PATENT DOCUMENTS

2013/0258139 A1* 10/2013 Omori ............... H04N 13/0007
348/239
2016/0044257 A1* 2/2016 Venkataraman ..... H04N 5/2258
348/239

FOREIGN PATENT DOCUMENTS

| JP | 2013-192003 A | 9/2013 |
| JP | 2014-130429 A | 7/2014 |

OTHER PUBLICATIONS

Stefan Hrabar, et al., "High Dynamic Range Stereo Vision for Outdoor Mobile Robotics", 2009 IEEE International Conference on Robotics and Automation, XP031510053, May 12, 2009, pp. 430-435.

* cited by examiner

IMAGING APPARATUS, IMAGING METHOD, AND IMAGING OPERATION CONTROL PROGRAM

CROSS-REFERENCE TO RELATED APPLICATION

The present application is based on and claims priority to Japanese patent application No. 2015-007721, filed Jan. 19, 2015, the disclosure of which is hereby incorporated by reference herein in its entirety.

BACKGROUND

Technical Field

The present invention relates to an imaging apparatus, imaging method, and imaging operation control program.

Description of Related Art

An imaging apparatus that obtains parallax information based on two images imaged by two imaging sections has been conventionally known.

Patent Literature 1 (Japanese Laid-Open Patent Application No. 2014-130429) describes a system that calculates a parallax value for pixels showing the same position through a matching process between a standard image and a comparative image by two imaging sections to extract a parallax value group corresponding to a feature of a parallax value distribution of a target, and to detect an image portion corresponding to the extracted parallax value group as a region showing the target. In this system, when the number of valid parallax values included in the extracted parallax value group is less, the accuracy of extracting the parallax value group corresponding to the target is lowered, resulting in deterioration in accuracy of recognizing the target. For this reason, in the system described in Patent Literature 1, in order to increase the number of parallax values included in the extracted parallax value group, exposure amount control that determines the exposure amount of each imaging section for use in a subsequent imaging operation is executed.

More specifically, in the system described in Patent Literature 1, the number of parallax values for the image portion of the target is calculated from the parallax information obtained from the image imaged at the presently set exposure amount, and the exposure control is executed when the calculated number of parallax values is out of the previously defined range. When the calculated number exceeds the upper limit value of the defined range, the exposure amount is deceased at a certain volume. When the calculated number lowers the lower limit value of the defined range, the exposure amount is increased at a certain volume. By executing such exposure amount control, a contrast of the image portion showing the target can be enhanced in the subsequent imaging operation, and the accuracy of the matching process between the standard image and the comparative image can be improved. As a result, the number of valid parallax values included in the parallax value group of the image portion of the target is increased, and the accuracy of recognizing the target is improved.

SUMMARY

When an imaging environment is drastically changed or a target is changed to a target having a greatly differing most suitable exposure amount, the most suitable exposure amount greatly differs from the exposure amount which has been set so far. In the exposure amount control described in Patent Literature 1, the exposure amount is adjusted only within a certain volume range with reference to the present exposure amount. For this reason, when the present exposure amount significantly differs from the most suitable exposure amount, the exposure amount cannot be set to the most suitable exposure amount by a one-time exposure amount control.

In the system described in Patent Literature 1, the exposure amount can be set to the most suitable exposure amount by repeating the exposure amount control. However, in such exposure amount control, the exposure amount determined based on the parallax information obtained by one frame (image) is used for the imaging operation of the frame two frames after that frame. For this reason, three frames are required until the one-time exposure amount control is completed (until the exposure amount determined based on the parallax information obtained from the image imaged at the present exposure amount is used for the imaging operation). Accordingly, when the present exposure amount greatly differs from the most suitable exposure amount due to a drastic change in imaging environment or a change in target to a target having a greatly differing most suitable exposure amount, it takes time to set the exposure amount to the most suitable exposure amount.

To solve the above problem, an aspect of the present invention provides an imaging apparatus including a plurality of imaging sections that images an imaging region, a parallax information generator that generates parallax information based on a plurality of images imaged by the plurality of imaging sections, and an exposure amount controller that determines an exposure amount for use in the plurality of imaging sections in a subsequent imaging operation to increase a number of parallax values contained in a parallax value group of an image portion showing a target in the imaging region, wherein the exposure amount controller executes parallax information obtaining control that obtains the parallax information corresponding to a plurality of exposure amounts generated based on the images imaged by the imaging sections with the plurality of exposure amounts, and executes exposure amount identifying control that identifies the exposure amount corresponding to the parallax information having a maximum number of parallax values in the obtained parallax information to determine the exposure amount for use in the imaging sections in the subsequent imaging operation based on the identified exposure amount.

DETAILED DESCRIPTION

Hereinafter, an embodiment of an imaging apparatus applied to a robot picking system will be described with reference to the drawings.

The robot picking system in this embodiment picks up with a robot arm one workpiece (for example, T-type pipe) in a box in which many workpieces (targets) are randomly stacked, and gives the workpiece to a subsequent processor. In this system, the inside of the box is imaged from the above, and the respective workpieces in the box are recognized based on the image. The operation of the robot arm is controlled to pick up one workpiece in the box from the above with a hand of the robot arm. Note that the imaging apparatus according to the embodiment of the present invention can be applied to another system having an image analyzer that executes a recognition process of a target in an imaging region based on an image.

Figure 1:
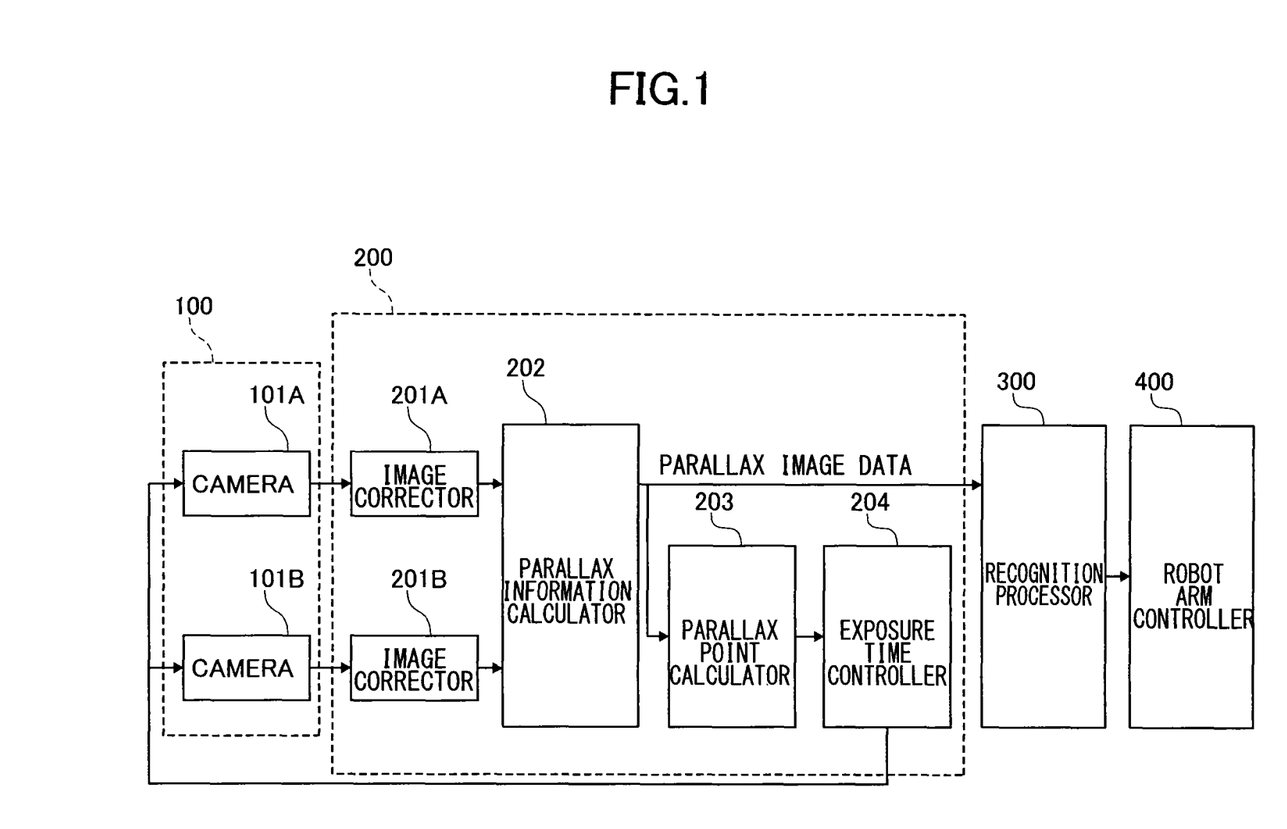
FIG. 1 is a block diagram showing main components of an imaging apparatus in a robot picking system according to an embodiment of the present invention.

FIG. 1 is a block diagram showing the main components of the imaging apparatus according to the embodiment of the present invention. The imaging apparatus of the present embodiment includes a camera unit 100 and an image processor 200. The camera unit 100 is a stereo camera including two cameras 101A and 101B as imaging sections. The two cameras 101A and 101B have the same configurations. Each of the cameras 101A and 101B includes an optical system such as an imaging lens, an image sensor including a pixel array having two-dimensionally arranged light-receiving elements, and a signal processor that creates image data in which analogue electric signals (light volume received by each light-receiving element of the image sensor) output from the image sensor are converted into digital electric signals.

The image processor 200 receives the image data output from the camera unit 100, and executes various image processes and exposure amount control of the camera unit 100. The image data output from each of the cameras 101A and 101B of the camera unit 100 is input to each of image correctors 201A and 201B that execute a correction process for converting the image data into an image that is obtained in an ideal pinhole mode. The image correctors 201A and 201B are provided with respect to the cameras 101A and 101B, respectively, and are configured by a Field-Programmable Gate Array (FPGA), a memory, and the like. The image correctors 201A and 201B execute correction processes such as magnification correction, image center correction, and distortion correction. The memory stores correction parameters and the like for use in these correction processes. For example, an Application Specific Integrated Circuit (ASIC) may be adopted instead of FPGA.

The corrected image data output from each of the image correctors 201A and 201B is transmitted to a parallax information calculator 202 as a parallax information generator. The parallax information calculator 202 executes a process of generating parallax image data obtained from the corrected image data obtained by imaging with each of the cameras 101A and 101B. The parallax information calculator 202 calculates parallax values of corresponding image portions between the two corrected images to obtain parallax image data from the corrected image data output from the each of the image correctors 201A and 201B.

One of the images imaged by each of the cameras 101A and 101B is used as a standard image and the other of the images is used as a comparative image. The positional shift of the image portion on the comparative image relative to the image portion on the standard image is calculated as the parallax value of the image portions. The image portions correspond to the same points in the imaging region. By using the principle of the triangulation, a distance to the same points in the imaging region, which correspond to the image portions, can be obtained from the parallax value. The parallax image data shows a parallax image in which the pixel value according to the parallax value calculated for each image portion on the standard image data (image data a imaged by the camera 101A, for example) is represented as a pixel value of each image portion. The parallax image data output from the parallax information calculator 202 is transmitted to a recognition processor 300 and a parallax point calculator 203.

The recognition processor 300 executes a process of independently recognizing many workpieces housed in a box in the imaging region by using the parallax image data output from the parallax information calculator 202. More specifically, for example, the recognition processor 300 detects an edge portion where the pixel value (parallax value) is drastically changed on the parallax image, and discriminates the image portions showing each of the workpieces from the detection result. Then, the recognition processor 300 identifies the image portion having the largest parallax value average from the discriminated image portions, and outputs the position of the workpiece in the horizontal direction corresponding to the identified image portion and the distance to the workpiece calculated from the parallax value average of the image portion to a robot arm controller 400 that controls the operation of the robot arm as workpiece recognition results. The workpiece identified as described above is a workpiece stacked on the top in the box.

The robot arm controller 400 obtains the position (horizontal direction position and distance) of one workpiece as the picking target based on the workpiece recognition result output from the recognition processor 300. The robot arm controller 400 controls the robot arm operation to take the workpiece in the obtained position from the box by picking the workpiece from the above with the hand portion of the robot arm, and give the workpiece to a subsequent processor.

In this embodiment, in order to improve the recognition accuracy of the workpiece as the target, it is necessary to appropriately adjust the exposure amount of the cameras 101A and 101B for the reasons set forth below.

In the recognition process by the recognition processor 300, the image portions showing the workpiece are recognized based on the parallax information between the images imaged by the two cameras 101A and 101B as described above. The recognition accuracy in this process depends on the number of parallax values (the number of pixels on the parallax image constituting a three-dimensional region) accurately calculated for the image portions showing the workpiece. The parallax value is calculated by accurately identifying (matching) the corresponding image portions between the images (the image portions on the respective images corresponding to the same point in the imaging region) as described above.

In the matching process, the correlation between the arrangement of a plurality of pixel values (brightness values) constituting the target image region in the standard image and the arrangement of a plurality of pixel values (brightness values) constituting each of image regions in the comparative image is calculated. The image regions (image regions each having a different position in the lateral direction (image horizontal direction) in the comparative image are located in the same position in the longitudinal direction (image vertical direction) as the target image region in the standard image including the corresponding image portion as a matching target. Then, the image region having the highest correlation among the image regions of the comparative image having a predetermined correlation or more is specified as the corresponding image region corresponding to the target image region in the standard image. The corresponding image portions between the images are thereby identified.

When many of the light-receiving elements that receive light from the imaging region including the workpiece exceed the saturation value as the upper limit value of the light volume detection region of the light receiving element, all of the pixel values (brightness values) corresponding to these light-receiving elements show saturation values. In this instance, the feature of the pixel value arrangement constituting the target image region in the standard image as the matching target is weakened. It becomes difficult to accurately execute the matching process. For this reason, the matching process of the image portions showing the workpiece may not be executed, and the parallax value may not be calculated. Moreover, a miss matching process may be executed, and a miss parallax value may be calculated. As a result, the number of accurately calculated parallax values (the number of pixels of the image portion on the parallax image corresponding to the image portion showing the workpiece) is reduced in the image portions showing the workpiece, resulting in deterioration in the accuracy of the recognition process by the recognition processor 300.

In addition, when many of the light receiving elements that receive light from the imaging region including the workpiece lower the lower limit value of the light volume detection region of the light-receiving element, the accuracy of the recognition process by the recognition processor 300 is also deteriorated.

In this embodiment, in order to increase the accuracy of the recognition process by the recognition processor 300, the exposure amount of each camera 101A and 101B is adjusted to increase the number of pixels (pixels on the parallax image) constituting the image portion of the workpiece which is recognized by the recognition processor 300. An exposure amount controller that adjusts the exposure amount is configured by the parallax point calculator 203 and an exposure time controller 204.

The parallax point calculator 203 counts the number of valid parallax values in the previously designated image portion from the parallax image data transmitted from the parallax information calculator 202. The exposure time controller 204 executes the exposure amount control that adjusts the exposure time in the imaging operation of each camera 101A and 101B in the camera unit 100 to the most suitable exposure time.

Figure 2:
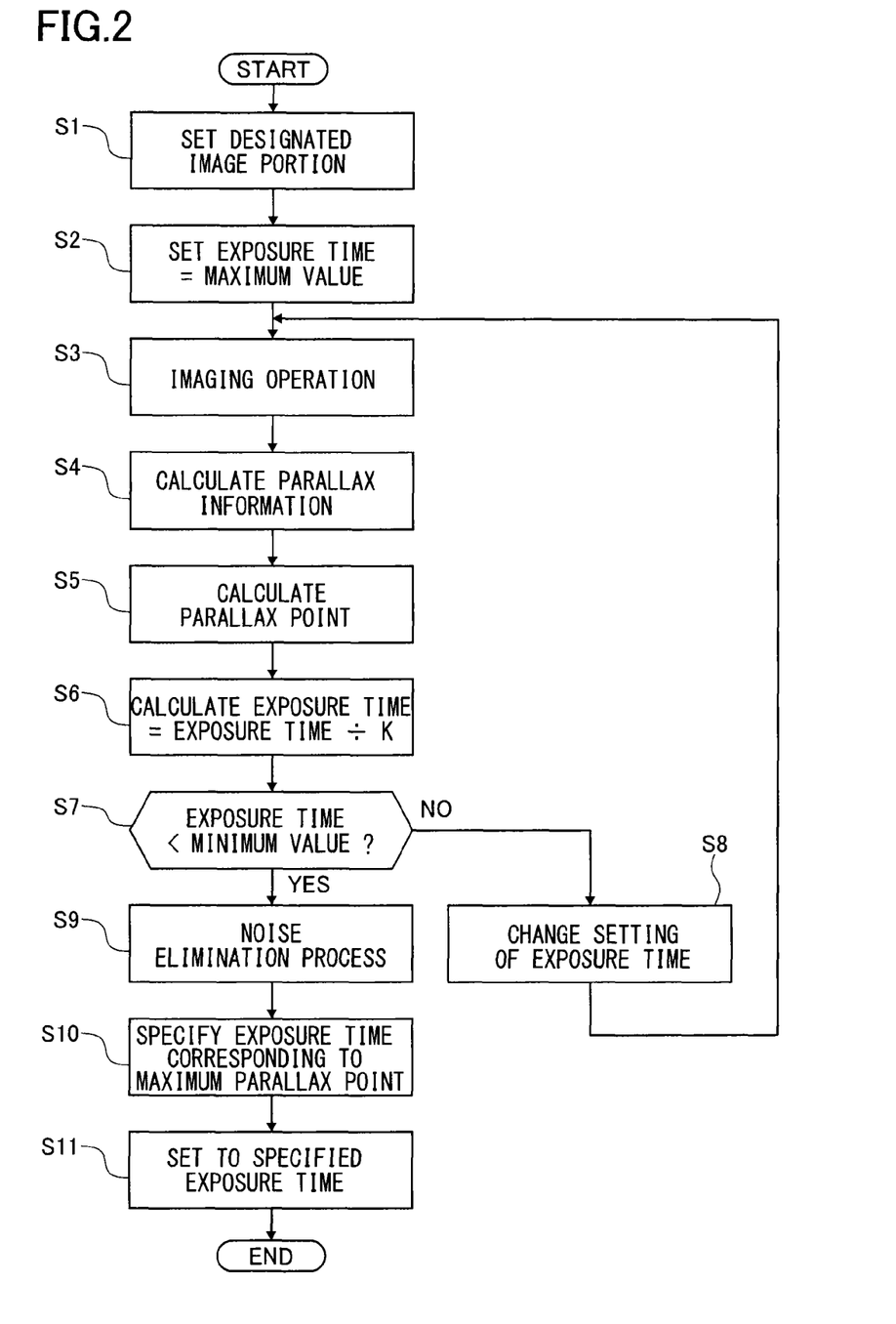
FIG. 2 is a flowchart showing a flow of exposure amount control according to the embodiment of the present invention.

FIG. 2 shows a flowchart showing a flow of the exposure amount control in the embodiment. Upon predetermined control execution timing, the exposure time controller 204 sets the designated image portion for counting the number of valid parallax values (S1), and transmits the set information to the parallax point calculator 203. This designated image portion is a rectangular image portion set along the inner rim of a box 500 housing the workpiece as the target, as shown by the frame A in FIG. 3. It is preferable for the designated image portion for counting the number of valid parallax values to be set to include the image portion showing the target and to exclude the image portion which does not show the target as many as possible. When the image portion which does not show the target (workpiece) is included, the number of unnecessary parallax values is counted which disturbs the optimization of the exposure time. Note that the shape of the designated image portion is not limited to a rectangular, and may be another shape such as a circle.

Next, the exposure time controller 204 sets the exposure time of each of the cameras 101A and 101B to the maximum value of the exposure time settable range (S2). After that, the imaging operation of each of the cameras 101A and 101B is executed in the set exposure time (S3), and the image data for one frame (standard image data and comparative image data) is obtained. This image data is corrected by the image correctors 201A and 201B, and the parallax image data (parallax information) is generated from the corrected image data by the parallax information calculator 202 (S4).

The parallax point calculator 203 calculates the number of pixels (parallax point) having the valid parallax value in the designated image portion on the parallax image based on the parallax image data generated as described above and the set information of the designated image portion received in the process step S1 (S5). The calculated parallax point is stored in an internal memory in accordance with the corresponding exposure time (in this case, maximum exposure time). Next, the presently set exposure time (maximum exposure time) is divided by a predetermined constant K (K>1) (S6), and the calculated exposure time is set to the exposure time for the next imaging operation (No in S7 and S8).

After that, by repeating the processes in Steps S3 to S8, the parallax point corresponding to each of the exposure times is accumulated in the internal memory. This reputation repetition of these processes is continued until the exposure time calculated in the process step S6 lowers the minimum value of the exposure time settable range (Yes in S7). When the exposure time lowers the minimum value, the exposure time controller 204 executes a process of eliminating a noise with Gaussian filter, for example, from the data of the number of parallax values and the exposure time accumulated in the internal memory (S9). After that, the exposure time corresponding to the maximum parallax point is identified from the exposure time and the data of the parallax point after the noise elimination (S10), and the identified exposure time is set to the exposure time of each of the cameras 101A and 101B (S11).

After that, the imaging operation of each of the cameras 101A and 101B is executed in the most suitable exposure time corresponding to the maximum valid parallax point in the designated image portion. As a result, in the recognition process with the recognition processor 300, the accuracy of the recognition of the workpiece shown in the designated image portion can be improved.

Figure 4:
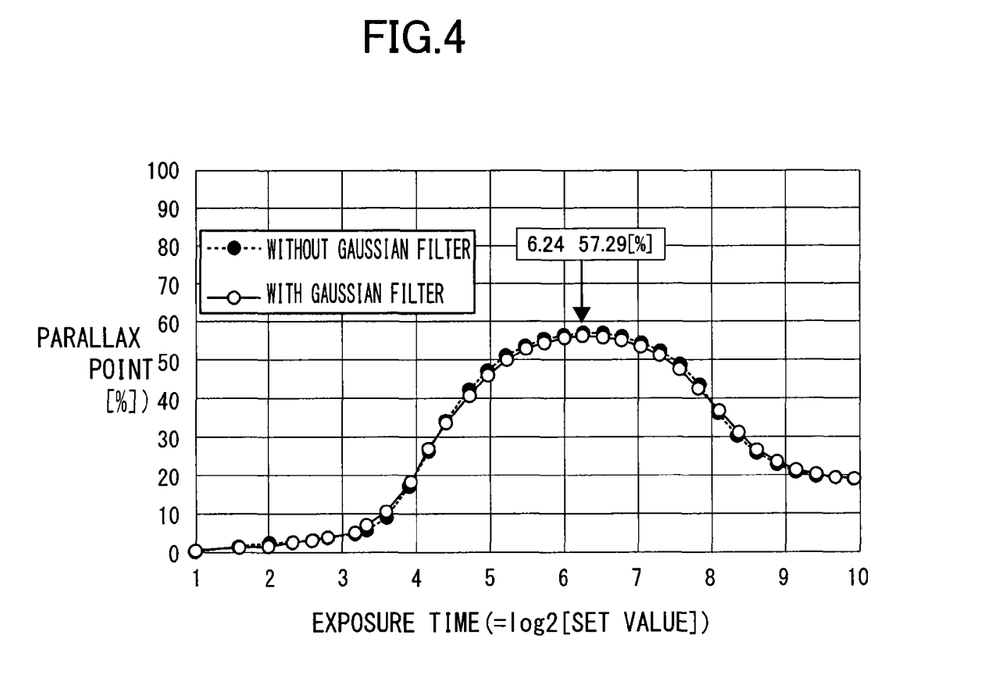
FIG. 4 is a graph showing one example of data of an exposure time and a parallax point accumulated in an internal memory by the exposure amount control according to the embodiment of the present invention.

FIG. 4 is a graph showing one example of data of the exposure time and the parallax point accumulated in the internal memory by the exposure amount control according to the embodiment of the present invention. The vertical axis of the graph shows a ratio (%) of the number of valid parallax values to the total number of pixels (maximum number of parallax values) in the designated image portion as the parallax point, and the horizontal axis of the graph shows a logarithmic value (Log 2) of the exposure time.

In the present embodiment, each of the exposure times corresponding to each of the parallax points to be accumulated in the internal memory is obtained by dividing the last exposure time by the constant K (K>1). The exposure time therefore shows a geometric progression set in the exposure time settable range. The graph shown in FIG. 4 is an example in which the maximum value of the exposure time settable range is set to 34 (ms) and the constant K is set to 1.2. The exposure time for use when obtaining the parallax point in the exposure amount control shows a geometric progression of 34.0 (ms), 28.3 (ms), . . . , 0.1 (ms).

As described above, since the ratio of the interval of the exposure time for obtaining the parallax point in the exposure amount control is equalized, the parallax point can be obtained at the exposure time interval in a range having a relatively short exposure time (dark target), which is shorter than that in a range having a relatively long exposure time (bright target). In the range having a relatively long exposure time, the pixel value (brightness value) of the image data is saturated, so that the number of valid pixel values lowers the number of valid pixel values in the range having a relatively short exposure time. For this reason, by obtaining the parallax point at the short exposure time interval in the range having a relatively short exposure time, a more suitable exposure time can be obtained even when the parallax point is obtained for the same number of exposure times.

The constant K is decreased to increase the plot point (the obtaining number of parallax points) for prioritizing the accuracy while the constant K is increased to reduce the plot point for prioritizing the shortening of the execution time of the exposure amount control.

The graph in FIG. 4 shows the results with the noise elimination process (S9) by Gaussian filter and without the noise elimination process. As shown in FIG. 4, by executing the noise elimination process with Gaussian filter, the relationship between the parallax point and the exposure time is smoothly changed. Thus, the peak of the parallax point can be accurately identified.

Figure 3:
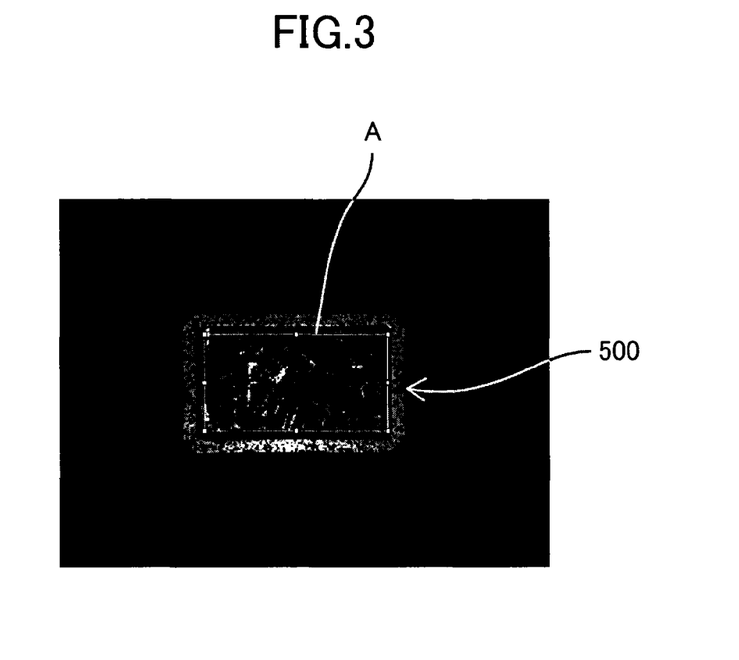
FIG. 3 is a view showing an example of a standard image representing a designated image portion for counting a valid parallax value.

According to the feature of the imaging optical system of each of the cameras 101A and 101B, the light-receiving amount of the image sensor is the maximum near the center portion thereof while the light-receiving amount of the image sensor is decreased toward the end portion thereof. Namely, the image has a brightness difference such that the image portions near the center portion of the image have the maximum brightness value (pixel value) while the brightness value is decreased toward the end portion of the image. In this embodiment, as shown in FIG. 3, the designated image portion is set such that the center of the image substantially coincides with the center of the designated image portion. The inside portion of the designated image portion has the brightness difference such that the brightness value is decreased from the center to the end portion of the designated image portion. Due to such a brightness difference, when the exposure time corresponding to the maximum parallax point is set as the most suitable exposure time as the exposure amount control of the present embodiment, the parallax point becomes maximum near the center of the designated image portion; however, the parallax point is decreased near the end portion of the designated image portion so that the set exposure time becomes inappropriate near the end portion of the designated image portion.

When projecting a random pattern to the imaging region of the camera unit 100 to improve the accuracy of the matching process, the projection amount becomes maximum near the center while the projection amount is decreased toward the end portion. For this reason, in projecting the random pattern, when the exposure time corresponding to the maximum parallax point is set as the most suitable exposure time, the set exposure time may be inappropriate in the end portion.

In this case, the exposure time may be adjusted to obtain a predetermined number of parallax points or more in both of the center portion and the end portion of the designated image portion. For example, after the exposure time corresponding to the maximum parallax point is identified as the present embodiment, the exposure time is set to an exposure time longer than that exposure time by a predetermined time. Alternately, after the exposure time corresponding to the maximum parallax point is identified as the present embodiment, the imaging operation is executed in a plurality of the exposure times longer than the exposure time, and the number of valid parallax values is calculated in both of the center portion and the end portion. Then, the exposure time corresponding to a predetermined number of valid parallax values or more is identified, and the exposure time is set as the most suitable exposure time.

MODIFIED EXAMPLE

Hereinafter, a modified example of a robot picking system in the embodiment of the present invention will be described. In this modified example, the operation of the robot arm is controlled to pick a workpiece (T-type pipe) placed on a white floor with a hand portion of a robot arm.

Figure 5:
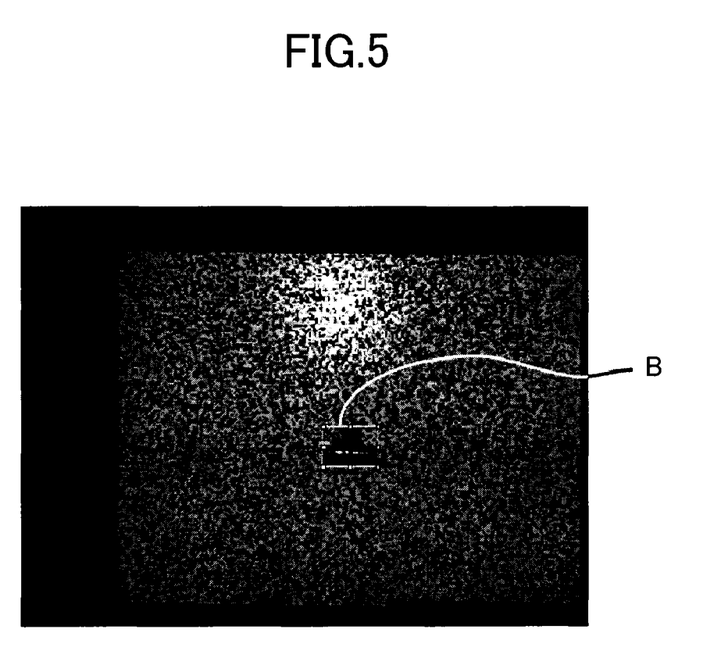
FIG. 5 is a view showing an example of the standard image representing a designated image portion for counting a valid parallax value according to a modified example of the present invention.

FIG. 5 is a view showing an example of a standard image representing a designated image portion for counting a valid parallax value. In this modified example, similar to the above embodiment, a random pattern is projected to the imaging region. In this modified example, similar to the above embodiment, a rectangular image portion including a workpiece as a target is set as the designated image portion as shown by the frame B in FIG. 5. When the designated image portion is set as described above, a ratio of the image portion to the image portion showing the workpiece is high inside the designated image portion. In this case, the proportion of the valid parallax value of the image portion except the image portion showing the workpiece is increased. As a result, the relationship between the exposure time corresponding to the maximum number of valid parallax values of the designated image portion and the exposure time corresponding to the maximum number of valid parallax values of the image portion showing the workpiece is lowered. Consequently, even when the exposure time corresponding to the maximum number of valid parallax values of the designated image portion is set, the most suitable exposure time for improving the recognition process of the workpiece may not be set.

Figure 6:
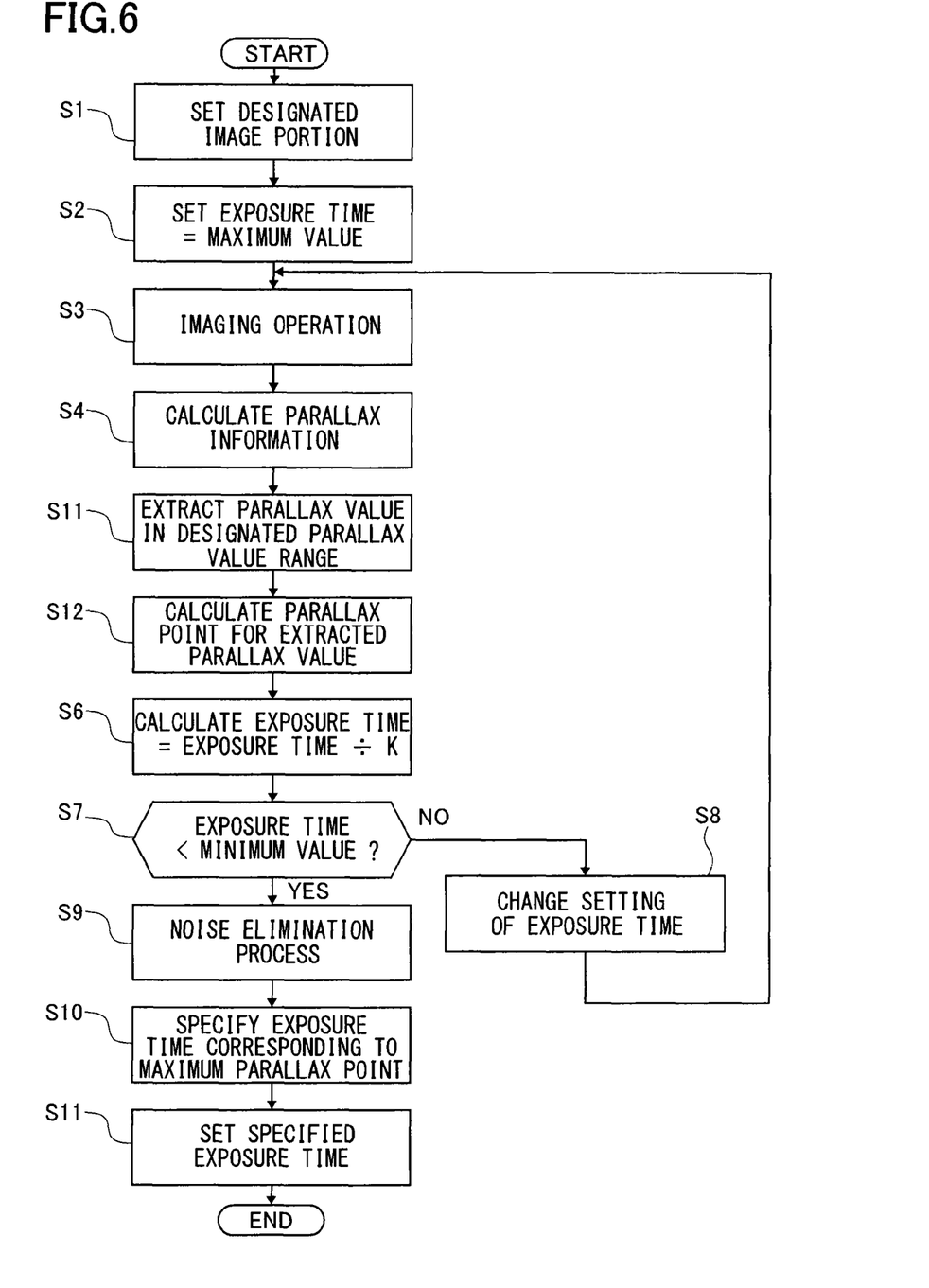
FIG. 6 is a flowchart showing a flow of exposure amount control according to the modified example.

FIG. 6 is a flowchart showing a flow of the exposure amount control in this modified example. The basic flow of the exposure amount control in this modified example is similar to that of the above embodiment. However, in this modified example, after calculating the parallax information (S4) by setting the rectangular designated image portion shown by the frame B in FIG. 5, a parallax value in the predetermined designated parallax value range is only extracted (S1). This designated parallax value range includes the parallax value corresponding to a distance to the workpiece placed on a floor, and is set to a range excluding the parallax value corresponding to a distance to the floor on which the workpiece is placed. More specifically, when the distance to the floor is 1 m and the height of the workpiece is 25 mm, the designated parallax value range is set to a parallax value range corresponding to a distance of 950 to 995 mm.

In this modified example, the parallax point obtained by counting the number of parallax values extracted as described above is calculated (S12). The number of parallax values for the image portion excluding the image portion of the floor in the designated image portion, namely, the number of the parallax values corresponding to the image portion of the workpiece can be therefore appropriately counted. As a result, the most suitable exposure time for improving the recognition process of the workpiece can be obtained.

In the present embodiment, the random pattern is projected to the imaging region of the camera unit 100 to improve the accuracy of the matching process. However, it is not always necessary to project the random pattern.

According to the embodiment of the present invention, the most suitable exposure time corresponding to the maximum number of valid parallax values for the image portion of the target can be set in a time shorter than that of the conventional device. The effects of examples according to the embodiment of the present invention will be described below.

Example A

An imaging apparatus includes a plurality of imaging sections such as the cameras 101A and 101B that image an imaging region, a parallax information generator such as the parallax information calculator 202 that generates parallax information based on a plurality of images imaged by a plurality of imaging sections, and an exposure amount controller as the parallax point calculator 203 and the exposure time controller 204 that determine an exposure amount such as the exposure time for use in a plurality of imaging sections in a subsequent imaging operation to increase the number of parallax values (parallax point) contained in a parallax value group of an image portion showing a target in the imaging region, wherein the exposure amount controller executes parallax information obtaining control that obtains the parallax information corresponding to a plurality of exposure amounts generated based on the images imaged by the imaging sections with a plurality of exposure amounts, and executes exposure amount identifying control that identifies the exposure amount corresponding to the parallax information having the maximum number of parallax values in the obtained parallax information to determine the exposure amount for use in the imaging sections in the subsequent imaging operation based on the identified exposure amount.

According to this Example, in order to determine the exposure amount, the parallax information corresponding to a plurality of exposure amounts is obtained by executing the parallax information obtaining control, and then the exposure amount corresponding to the parallax information having the maximum number of parallax values is identified by the exposure amount identifying control. The exposure amount for use in the imaging sections in the subsequent imaging operation is therefore determined based on the identified exposure amount. Accordingly, by appropriately setting a plurality of exposure amounts for use in the parallax information obtaining control, the most suitable exposure amount can be determined by the one-time exposure amount control even when the most suitable exposure amount corresponding to the maximum number of valid parallax values for the image portion of the target significantly differs from the exposure amount which has been set so far.

However, in this example, a plurality of imaging operations is required for obtaining the parallax information corresponding to a plurality of exposure amounts during the one-time exposure amount control. For this reason, a time required for the one-time exposure amount control becomes longer than that of the exposure amount control described in Patent Literature 1 which obtains only the parallax information corresponding to one exposure amount in the one-time exposure amount control (namely, one-time imaging operation). However, in this example, the imaging operation can be continuously executed in a plurality of exposure amounts during the one-time exposure amount control. Consequently, when the present exposure amount significantly differs from the most suitable exposure amount, a time required for setting the most suitable exposure amount can be shortened compared to a case described in Patent Literature 1 which obtains the most suitable exposure amount through the reputation of the exposure amount control and requires three frames until the completion of the one-time exposure amount control.

As described above, the exposure amount control of this example can be applied to an in-vehicle equipment control system to which the imaging apparatus described in Patent Literature 1 is applied. In the in-vehicle equipment control system, the recognition process of the target is executed by continuously generating the parallax information based on each of the images obtained by the continuous imaging operations. In this example, a plurality of imaging operations is required until the exposure amount control is completed. When the exposure amounts set by the imaging operations include an inappropriate exposure amount, appropriate parallax information cannot be obtained in such an inappropriate exposure amount. Even in this case, when the present exposure amount significantly differs from the most suitable exposure amount, the time required for setting the most suitable exposure amount is shorter than that of the exposure amount control described in Patent Literature 1. Accordingly, in this example, a period which cannot obtain appropriate parallax information is shorter than that of the exposure time control described in Patent Literature 1, so that the recognition process of the target can be improved compared to the exposure amount control described in Patent Literature 1 even when the recognition process of the target is executed by continuously generating the parallax information from each of the images obtained through the continuous imaging operations.

Example B

In the Example A, the exposure amount controller determines an exposure amount higher than the identified exposure amount by the exposure amount identifying control as the exposure amount for use in the imaging sections in the subsequent imaging operation.

According to this Example, even when the image portion for counting the number of parallax values includes a portion having a relatively low brightness value, that portion is prevented from being set by an inappropriate exposure amount.

Example C

In the Example A or Example B, the exposure amount controller uses three or more exposure times based on a geometric progression set in a predetermined exposure time range as a plurality of exposure amounts for use in the parallax information obtaining control.

According to this Example, the number of parallax values can be obtained at the exposure amount interval in a range having a relatively small exposure amount (dark target), which is shorter than that in a range having a relatively large exposure amount (bright target). In the range having a relatively large exposure time, the pixel value (brightness value) of the image is saturated, so that the number of valid pixel values lowers the number of valid pixel values in the range having a relatively small exposure amount. For this reason, the most suitable exposure amount is often obtained in the range having a relatively small exposure amount. By obtaining the number of parallax vales at the short exposure amount interval in the range having a relatively small exposure amount, a more suitable exposure amount can be obtained even when the number of parallax values is obtained for the same number of exposure amount.

Example D

In any one of the Examples A to C, the exposure amount identifying control identifies the exposure amount corresponding to the parallax information having the maximum number of parallax values for the image portion (designated image portion) designated by a predetermined image portion designation condition.

According to this Example, by setting the predetermined image portion designation condition to obtain the designated image portion including the image portion showing the target and excluding the image portion which does not show the target as much as possible, the most suitable exposure time for discriminating the target can be easily set.

Example E

In any one of Examples A to D, the exposure amount identifying control identifies the exposure amount corresponding to the parallax information having the maximum number of parallax values in a parallax value range (designated parallax value range) designated by a predetermined parallax value range designation condition.

According to this Example, as described in Modified Example, the number of parallax values of the image portion showing the target can be obtained, so that the most suitable exposure amount for discriminating the target can be easily set.

Example F

An imaging method includes a step of generating parallax information based on a plurality of images imaged by a plurality of imaging sections that images an imaging region; and a step of executing exposure amount control that determines an exposure amount for use in the plurality of imaging sections in a subsequent imaging operation to increase a number of parallax values contained in a parallax value group of an image portion showing a target in the imaging region, wherein the step of executing exposure amount control executes parallax information obtaining control that obtains the parallax information corresponding to a plurality of exposure amounts generated based on the images imaged by the imaging sections with the plurality of exposure amounts, and executes exposure amount identifying control that identifies the exposure amount corresponding to the parallax information having a maximum number of parallax values in the obtained parallax information to determine the exposure amount for use in the imaging sections in the subsequent imaging operation based on the identified exposure amount.

According to this Example, by appropriately setting a plurality of exposure amounts for use in the parallax information obtaining control, the most suitable exposure amount can be determined by the one-time exposure amount control even when the most suitable exposure amount corresponding to the maximum number of valid parallax values for the image portion of the target significantly differs from the exposure amount which has been set so far. The time required for setting the most suitable exposure amount can be shortened compared to the exposure amount control described in Patent Literature 1.

Example G

In a non-transitory computer-readable computer medium storing an imaging operation control program that operates a computer of an imaging apparatus including a plurality of imaging sections that images an imaging region, the program operates the computer as a parallax information generator that generates parallax information based on a plurality of images imaged by the plurality of imaging sections, and an exposure amount controller that determines an exposure amount for use in the plurality of imaging sections in a subsequent imaging operation to increase a number of parallax values contained in a parallax value group of an image portion showing a target in the imaging region, and the exposure amount controller executes parallax information obtaining control that obtains the parallax information corresponding to a plurality of exposure amounts generated based on the images imaged by the imaging sections with the plurality of exposure amounts, and executes exposure amount identifying control that identifies the exposure amount corresponding to the parallax information having a maximum number of parallax values in the obtained parallax information to determine the exposure amount for use in the imaging sections in the subsequent imaging operation based on the identified exposure amount.

According to this Example, by appropriately setting a plurality of exposure amounts for use in the parallax information obtaining control, the most suitable exposure amount can be determined by the one-time exposure amount control even when the most suitable exposure amount corresponding to the maximum number of valid parallax values for the image portion of the target significantly differs from the exposure amount which has been set so far. The time required for setting the most suitable exposure amount can be shortened compared to the exposure amount control described in Patent Literature 1.

In addition, this program can be recorded in a recording medium such as a CD-ROM to be distributed and acquired. Signals having the program transmitted by a predetermined transmitting device can be delivered and received via a public phone line, dedicated line, and transmitting medium such as communication network. In this delivering, at least a part of the computer program is transmitted to the transmitting medium. Namely, it is not always necessary for all of the data of the computer program temporarily to exist in the transmitting medium. The signals having the program are computer data signals realized in a predetermined carrier wave containing the computer program. A method of transmitting the computer program from a predetermined transmitting device includes continuous transmission of data constituting a program and intermittent transmission of data constituting a program.

Although the present invention has been described in terms of exemplary embodiment, it is not limited thereto. It should be appreciated that variations or modifications may be made in the embodiment described by persons skilled in the art without departing from the scope of the present invention as defined by the following claims.

What is claimed is:

1. An imaging apparatus comprising:
a plurality of imaging sections that images an imaging region;
a parallax information generator that generates parallax information based on a plurality of images imaged by the plurality of imaging sections; and
an exposure amount controller that determines an exposure amount for use in the plurality of imaging sections in a subsequent imaging operation to increase a number of parallax values contained in a parallax value group of an image portion showing a target in the imaging region, wherein
the exposure amount controller executes parallax information obtaining control that obtains the parallax information corresponding to a plurality of exposure amounts generated based on the images imaged by the imaging sections with the plurality of exposure amounts, and executes exposure amount identifying control that identifies the exposure amount corresponding to the parallax information having a maximum number of parallax values in the obtained parallax information to determine the exposure amount for use in the imaging sections in the subsequent imaging operation based on the identified exposure amount.

2. The imaging apparatus according to claim 1, wherein the exposure amount controller determines an exposure amount higher than the identified exposure amount by the exposure amount identifying control as the exposure amount for use in the imaging sections in the subsequent imaging operation.

3. The imaging apparatus according to claim 2, wherein the exposure amount controller uses three or more exposure times based on a geometric progression set in a predetermined exposure time range as the plurality of exposure amounts for use in the parallax information obtaining control.

4. The imaging apparatus according to claim 3, wherein the exposure amount identifying control identifies the exposure amount corresponding to the parallax information having the maximum number of parallax values for the image portion designated by a predetermined image portion designation condition.

5. The imaging apparatus according to claim 4, wherein the exposure amount identifying control identifies the exposure amount corresponding to the parallax information having the maximum number of parallax values in a parallax value range designated by a predetermined parallax value range designation condition.

6. The imaging apparatus according to claim 3, wherein the exposure amount identifying control identifies the exposure amount corresponding to the parallax information having the maximum number of parallax values in a parallax value range designated by a predetermined parallax value range designation condition.

7. The imaging apparatus according to claim 2, wherein the exposure amount identifying control identifies the exposure amount corresponding to the parallax information having the maximum number of parallax values for the image portion designated by a predetermined image portion designation condition.

8. The imaging apparatus according to claim 7, wherein the exposure amount identifying control identifies the exposure amount corresponding to the parallax information having the maximum number of parallax values in a parallax value range designated by a predetermined parallax value range designation condition.

9. The imaging apparatus according to claim 2, wherein the exposure amount identifying control identifies the exposure amount corresponding to the parallax information having the maximum number of parallax values in a parallax value range designated by a predetermined parallax value range designation condition.

10. The imaging apparatus according to claim 1, wherein the exposure amount controller uses three or more exposure times based on a geometric progression set in a predetermined exposure time range as the plurality of exposure amounts for use in the parallax information obtaining control.

11. The imaging apparatus according to claim 10, wherein the exposure amount identifying control identifies the exposure amount corresponding to the parallax information having the maximum number of parallax values for the image portion designated by a predetermined image portion designation condition.

12. The imaging apparatus according to claim 11, wherein the exposure amount identifying control identifies the exposure amount corresponding to the parallax information having the maximum number of parallax values in a parallax value range designated by a predetermined parallax value range designation condition.

13. The imaging apparatus according to claim 10, wherein the exposure amount identifying control identifies the exposure amount corresponding to the parallax information having the maximum number of parallax values in a parallax value range designated by a predetermined parallax value range designation condition.

14. The imaging apparatus according to claim 1, wherein the exposure amount identifying control identifies the exposure amount corresponding to the parallax information having the maximum number of parallax values for the image portion designated by a predetermined image portion designation condition.

15. The imaging apparatus according to claim 14, wherein the exposure amount identifying control identifies the exposure amount corresponding to the parallax information having the maximum number of parallax values in a parallax value range designated by a predetermined parallax value range designation condition.

16. The imaging apparatus according to claim 1, wherein the exposure amount identifying control identifies the exposure amount corresponding to the parallax information having the maximum number of parallax values in a parallax value range designated by a predetermined parallax value range designation condition.

17. An imaging method comprising:
a step of generating parallax information based on a plurality of images imaged by a plurality of imaging sections that images an imaging region; and
a step of executing exposure amount control that determines an exposure amount for use in the plurality of imaging sections in a subsequent imaging operation to increase a number of parallax values contained in a parallax value group of an image portion showing a target in the imaging region, wherein
the step of executing exposure amount control executes parallax information obtaining control that obtains the parallax information corresponding to a plurality of exposure amounts generated based on the images imaged by the imaging sections with the plurality of exposure amounts, and executes exposure amount identifying control that identifies the exposure amount corresponding to the parallax information having a maximum number of parallax values in the obtained parallax information to determine the exposure amount for use in the imaging sections in the subsequent imaging operation based on the identified exposure amount.

18. A non-transitory computer-readable computer medium storing an imaging operation control program that operates a computer of an imaging apparatus including a plurality of imaging sections that images an imaging region, wherein the program operates the computer as a parallax information generator that generates parallax information based on a plurality of images imaged by the plurality of imaging sections, and an exposure amount controller that determines an exposure amount for use in the plurality of imaging sections in a subsequent imaging operation to increase a number of parallax values contained in a parallax value group of an image portion showing a target in the imaging region, and the exposure amount controller executes parallax information obtaining control that obtains the parallax information corresponding to a plurality of exposure amounts generated based on the images imaged by the imaging sections with the plurality of exposure amounts, and executes exposure amount identifying control that identifies the exposure amount corresponding to the parallax information having a maximum number of parallax values in the obtained parallax information to determine the exposure amount for use in the imaging sections in the subsequent imaging operation based on the identified exposure amount.

* * * * *